(12) United States Patent
Harada

(10) Patent No.: US 6,697,587 B2
(45) Date of Patent: Feb. 24, 2004

(54) SEMICONDUCTIVE RUBBER COMPOSITION, CHARGING MEMBER, ELECTROPHOTOGRAPHIC APPARATUS, AND PROCESS CARTRIDGE

(75) Inventor: Masaaki Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 09/879,182

(22) Filed: Jun. 13, 2001

(65) Prior Publication Data
US 2002/0022142 A1 Feb. 21, 2002

(30) Foreign Application Priority Data
Jun. 19, 2000 (JP) .......................... 2000-183121

(51) Int. Cl.[7] .......................... G03G 21/18; G03G 5/02; H01B 1/24
(52) U.S. Cl. .......................... 399/111; 399/168; 252/511
(58) Field of Search .......................... 252/511; 399/111, 399/168

(56) References Cited

U.S. PATENT DOCUMENTS 5,140,371 A  8/1992 Ishihara et al. ............. 355/219
6,221,282 B1 * 4/2001 van Konynenburg ....... 252/511
6,458,883 B1 * 10/2002 Takashima et al.

FOREIGN PATENT DOCUMENTS

JP  2705780  10/1997

* cited by examiner

Primary Examiner—Mark Kopec
(74) Attorney, Agent, or Firm—Fitzpatrick, Cella, Harper & Scinto

(57) ABSTRACT

A semiconductive rubber composition is provided having superior electrical properties, such as superior uniformity, small voltage dependence, small environmental dependence, and stability with time. In addition, the semiconductive rubber composition can be used for forming a charging member which suppresses contamination of a member to be charged, such as a photosensitive member. In the semiconductive rubber composition, a dispersed domain structure is formed having a polymeric continuous phase composed of an ion conductive rubber material primarily containing a raw rubber A having an intrinsic volume resistivity of $1 \times 10^{12}$ $\Omega \cdot cm$ or less and a polymeric dispersed phase composed of an electron conductive rubber material and conductive particles mixed therewith.

10 Claims, 4 Drawing Sheets

SEMICONDUCTIVE RUBBER COMPOSITION, CHARGING MEMBER, ELECTROPHOTOGRAPHIC APPARATUS, AND PROCESS CARTRIDGE

BACKGROUND OF THE INVENTION

1. Field of the Invention

The present invention relates to semiconductive rubber compositions in which the electrical resistance is easily set, is uniform and stable, and is not likely to be influenced by environmental changes in temperature, humidity, and the like, and more particularly, relates to a semiconductive rubber composition preferably forming an elastic layer of a conductive member in pressure-contact with a photosensitive member in the steps of charging, developing, transferring, and the like performed in an electrophotographic image forming apparatus, such as a copying machine, a printer, or a facsimile machine.

2. Description of the Related Art

In an image forming apparatus, that is, in an electrostatic recording apparatus, an electrophotographic apparatus, and the like, such as a copying machine and an optical printer, as an apparatus for charging the surface of an image supporting member, such as a photosensitive member, a dielectric member, or the like, a corona discharge apparatus has been widely used.

The corona discharge apparatus is effective for uniformly charging the surface of the member to be charged, such as an image supporting member, to a predetermined potential; however, there have been problems in that the apparatus is large since an expensive high-voltage power source is required, a large amount of corona products such as ozone is formed during discharge, the surface of the member to be charged is damaged by abnormal discharge, and the like.

In addition to the corona discharge apparatus described above, recently, a contact charging method tends to be employed. In the contact charging method, a charging member to which a voltage is applied (hereinafter referred to as a charging member) is placed in contact with or is placed in the vicinity of the surface of the member to be charged so as to perform a charging treatment on the surface thereof. Compared to the corona discharge method, the advantages of the contact charging method are that the formation of the corona products such as ozone is suppressed, cost reduction or miniaturization of the apparatus can be achieved due to the simple structure thereof, damage of the surface of the member to be charged caused by abnormal discharge is decreased, and the like. In general, a charging member in the form of a rubber roller composed of a semiconductive elastic layer formed around a metal shaft is used.

In order to prevent leakage caused by pinholes or damages on the surface of the members to be charged such as a photosensitive member, an elastic layer of the charging member used in the contact charging method must have an appropriate electrical conductivity. In addition, in order to uniformly charge the member to be charged, it is important that the charging member has uniform semiconductive properties having an intrinsic volume resistivity of approximately $1 \times 10^3$ to $1 \times 10^9$ Ω·cm. In order to realize the electrical properties described above, heretofore, an electron conductive rubber material containing electron conductive particles such as an electron conductive carbon black has been used for forming an elastic layer having semiconductive properties.

The electrical conductivity can be controlled by adjusting the amount of conductive particles such as a conductive carbon black added to a raw rubber for forming the electron conductive rubber material described above; however, an electrical resistance in a semiconductive region in which the intrinsic volume resistance is in the range of from $1 \times 10^3$ to $1 \times 10^9$ Ω·cm may be considerably varied by a small change in addition amount of the conductive particles in some cases. In the case described above, it becomes difficult to form an elastic rubber layer having a uniform and a predetermined electrical resistance in the semiconductive region, and as a result, the electrical resistance in the charging member and between the charging members is easily varied.

In addition, in the electron conductive rubber material, the electrical conductivity largely depends on the distance between the conductive particles. Accordingly, since the charge between the conductive particles is more easily transferred due to the electric field effect when an applied voltage is increased, the voltage dependence of the electrical resistance is increased, and as result, a uniform image may not be obtained in some cases even when a stable current flows.

A contact charging member provided with a conductive layer containing a conductive pigment and a polymeric elastomer is disclosed in U.S. Pat. No. 2,705,780, in which the conductive layer contains two polymeric elastomers therein, i.e., a polymeric elastomer A and a polymeric elastomer B having an affinity to the conductive pigment lower that that of the polymeric elastomer A, and in which the amount of the conductive pigment contained in an area formed of the polymeric elastomer A is larger than that in an area formed of the polymeric elastomer B.

In this rubber material described above, according to the publication described above, two types of polymeric elastomer portions uniformly coexist. One polymeric elastomer portion, which is obtained by uniformly dispersing the conductive pigment in a polymeric elastomer having a high affinity thereto, has a low resistance but has a small variation thereof, and the other polymeric elastomer portion has a high resistance and a low affinity to the conductive pigment and contains no conductive pigment or a relatively small amount thereof. Accordingly, as a whole, a contact charging member can be obtained having a small variation in charging properties in an intermediate resistance region.

However, in the structure in which the conductive pigment is primarily contained in a polymeric elastic portion forming domain portions, since a polymeric elastomer forming a continuous phase portion has a high resistance, the electrical conductivity between domains depends on a voltage applied thereto, and hence, the voltage dependence of the resistance of the charging member tends to increase.

In addition, as a method for forming a rubber composition having a uniform resistance and a small voltage dependence of the resistance, it is known that an elastic layer is formed of a polar rubber having its own semiconductive properties, such as an epichlorohydrine rubber, and an ion conductive rubber material such as a rubber composition containing an ion conductive agent so as to have semiconductive properties. However, in the case described above, since the intrinsic volume resistivity of the elastic layer is varied in accordance with the environmental change in temperature or humidity, the electrical properties may be varied depending on environmental conditions in some cases.

In addition, in the ion conductive rubber material, even though a large amount of ion conductive agent is contained, an intrinsic volume resistivity of $1 \times 10^5$ Ω·cm or less may be difficult to obtain in some cases, and an image defect may occur by contamination caused by the ion conductive agent transferred to the photosensitive member in some cases.

SUMMARY OF THE INVENTION

Accordingly, an object of the present invention is to provide a semiconductive rubber composition comprising a polymeric dispersed phase containing conductive particles, that is, is to provide a semiconductive rubber composition containing a polymeric dispersed phase having electron conductive properties. The semiconductive rubber composition has superior electrical properties, such as a small variation in electrical resistance in a voltage application, uniform electrical properties, little change in electrical properties due to an environmental change in temperature, humidity, and the like, and stable electrical properties with time. In addition, the semiconductive rubber composition described above can be used for forming a charging member which prevents contamination of the member to be charged, such as a photosensitive member.

In addition, another object of the present invention is to provide an electrophotographic apparatus and a process cartridge, which are provided with the charging member described above.

To these ends, a semiconductive rubber composition according to the present invention has a dispersed domain structure, in which the dispersed domain structure comprises a polymeric continuous phase comprising an ion conductive rubber material and a polymeric dispersed phase comprising an electron conductive rubber material. In the semiconductive rubber composition described above, the ion conductive rubber material primarily contains a raw rubber A having an intrinsic volume resistivity of $1\times10^{12}$ $\Omega\cdot$cm or less, and the electron conductive rubber material contains a raw rubber B and conductive particles mixed therewith.

According to the present invention, a charging member to which a voltage is applied and which is brought into contact with a member to be charged so as to charge the member comprises an elastic layer, wherein the elastic layer comprises the semiconductive rubber composition described above.

In addition, an electrophotographic apparatus according to the present invention comprises a charging member and an electrophotographic photosensitive member, wherein the charging member is the charging member described above.

Furthermore, a process cartridge according to the present invention comprises an electrophotographic photosensitive member and a charging member, wherein the electrophotographic photosensitive member is assembled integrally with the charging member so as to form a cartridge which is detachably mountable to a main image forming apparatus, and the charging member is the charging member described above.

Further objects, features and advantages of the present invention will become apparent from the following description of the preferred embodiments (with reference to the attached drawings).

DESCRIPTION OF THE PREFERRED EMBODIMENTS

Hereinafter, preferable embodiments of the present invention will be described.

Figure 1:
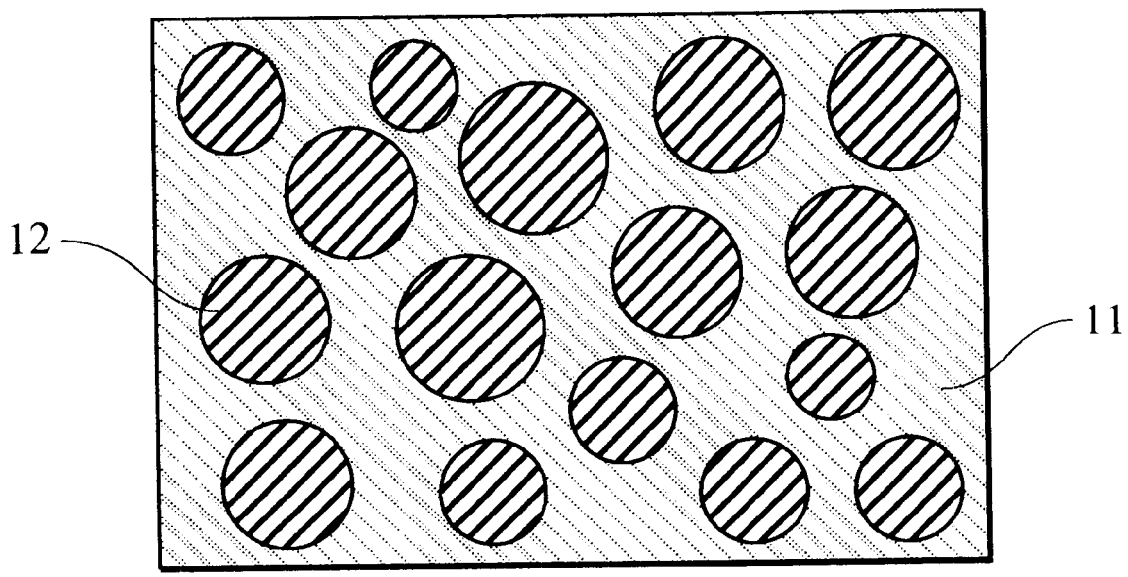
FIG. 1 is a schematic view for illustrating a dispersed domain structure according to the present invention.

In the present invention, as shown in FIG. 1, by forming a dispersed domain structure of a polymeric continuous phase 11 comprising an ion conductive rubber material primarily containing raw rubber A and a conductive polymeric dispersed phase 12 comprising an electron conductive rubber material containing a raw rubber B and conductive particles mixed therewith, a semiconductive rubber composition having superior electrical resistance, such as a small variation, a small voltage dependence, and a small environmental dependence, can be formed.

In addition, the ion conductive rubber material of the polymeric continuous phase is primarily composed of a raw rubber A having an intrinsic volume resistivity of $1\times10^{12}$ $\Omega\cdot$cm. Accordingly, conductive particles are not necessarily added to the ion conductive rubber material, and even if they are added thereto, the added conductive particles do not practically contribute to the conductive properties of the ion conductive rubber material. As a result, the voltage dependence of the electrical resistance of the entire semiconductive rubber composition can be decreased.

In addition, by changing a mixing ratio of the ion conductive rubber material forming the polymeric continuous phase to the electron conductive rubber material forming the polymeric dispersed phase so as to change the presence ratio of the polymeric dispersed phase, the electrical resistance of the semiconductive rubber composition can be changed. Accordingly, the electrical resistance of the entire semiconductive rubber composition thus formed can be easily controlled to have a predetermined value.

Furthermore, the electrical resistance of the ion conductive rubber material itself forming the polymeric continuous layer may be easily varied corresponding to environmental changes in some cases; however, intermediate resistance properties of the entire rubber composition is determined by the presence ratio of the polymeric dispersed phase having intermediate resistance properties. Accordingly, the electrical resistance of the entire semiconductive rubber composition is unlikely to be influenced by the environmental changes in temperature, humidity, and the like.

The ion conductive rubber of the present invention is a polar rubber having its own semiconductive properties, such as an epichlorohydrine rubber, a semiconductive rubber composition containing an ion conductive agent, or the like.

In addition, the raw rubber A primarily forming the ion conductive rubber material is a rubber having an intrinsic volume resistance of $1\times10^{12}$ $\Omega\cdot$cm or less without containing conductive particles.

Furthermore, the intrinsic volume resistivity of the ion conductive rubber material forming the polymeric continuous phase is $1\times10^{12}$ $\Omega\cdot$cm or less, and more preferably, is $1\times10^{10}$ $\Omega\cdot$cm or less. Concerning the intrinsic volume resistivity of a semiconductive rubber material having a dispersed domain structure, the electrical properties of the polymeric continuous phase tend to significantly contribute to the intrinsic volume resistivity compared to those of the polymeric dispersed phase. Consequently, when the intrinsic volume resistivity of the polymeric continuous phase is $1\times10^{12}$ $\Omega\cdot$cm or less, a semiconductive rubber composition having an intermediate resistant can be easily formed. In addition, when the intrinsic volume resistivity is $1\times10^{12}$ $\Omega\cdot$cm or less, the ratio of the polymeric dispersed phase is not necessary to increase in order to decrease the electrical resistance.

In general, in the case in which polymers incompatible with each other are blended, even though the dispersed domain structure depends on the viscosities of the polymers and blending conditions therefor to some extent, a polymer having a high composition ratio tends to form a continuous phase. Accordingly, as described above, by using an ion conductive rubber material having an intrinsic volume resistivity of $1 \times 10^{12}$ Ω·cm or less, the blending ratio of an electron conductive rubber material can be decreased, and hence, the ratio of the polymeric dispersed phase can be decreased. As a result, a stable polymeric dispersed phase can be formed, and hence, the dispersed domain structure of the entire semiconductive rubber composition can be stabilized.

In this connection, an ion conductive rubber material having an intrinsic volume resistivity of $1 \times 10^{12}$ Ω·cm or less can be formed by adding an ion conductive agent to an insulating rubber; however, in the case described above, a large amount of the ion conductive agent must be used in order to decrease the electrical resistance of the insulating rubber. In addition, since an insulating rubber generally has poor compatibility with an ion conductive agent, bleedout of the ion conductive agent may occur, and hence, it is not preferable since a photosensitive member may be contaminated in some cases.

As preferable examples of the raw rubber A used for an ion conductive rubber material having an intrinsic volume resistivity of $1 \times 10^{12}$ Ω·cm or less, an epichlorohydrine homopolymer (CHC), an epichlorohydrine-ethyleneoxide copolymer (CHR), an epichlorohydrine-ethyleneoxide-allylglycidylether terpolymer (CHR-AGE), an acrylonitrile-butadiene copolymer (NBR), a hydrogenated acrylonitrile-butadiene copolymer (H-NBR), a chloroprene rubber (CR), an acrylic rubber (ACM, ANM), a urethane rubber (U), and the like may be used alone or in combination with at least two rubber materials mentioned above. A single rubber material mentioned above or a material composed of at least two rubber materials exhibits ion conductivity having an intrinsic volume resistivity of $1 \times 10^{12}$ Ω·cm or less without containing a conductive agent.

In this connection, an ion conductive agent may be added to the raw rubber A in some cases so that no bleedout of the ion conductive agent occurs. As the ion conductive agents, for examples, there may be mentioned ionic inorganic materials, such as lithium perchlorate, sodium perchlorate, and potassium perchlorate; cationic surfactants, such as lauryltrimethyl ammonium chloride, stearyltrimethyl ammonium chloride, octadecyltrimethyl ammonium chloride, dodecyltrimethyl ammonium chloride, hexadecyltrimethyl ammonium chloride, trioctylpropyl ammonium bromide, and an aliphatic modified dimethylethyl ammonium ethosulfate; ampholytic surfactants, such as lauryl betaine, stearyl betaine, and dimethylalkyllauryl betaine; quaternary ammonium salts, such as tetraethyl ammonium perchlorate, tetrabutyl ammonium perchlorate, and trimetyloctadecyl ammonium perchlorate; and organic acid salts of lithium such as lithium trifluoromethane sulfonate.

The content of the ion conductive agent described above is generally 0.5 to 5.0 parts by weight with respect to 100 parts by weight of the raw rubber A.

In addition, a reinforcing agent may be added to the raw rubber A as long as the conductive properties thereof is not adversely influenced, that is, a reinforcing carbon black may be added to the raw rubber A within the range in which the resistance thereof will not be substantially varied. As the reinforcing carbon black used for this purpose, a carbon black having low conductive properties, such as FEF, GPF, SRF, or MT carbons, may be mentioned.

The content of the carbon black mentioned above is generally 5 to 50 parts by weight with respect to 100 parts by weight of the raw rubber A.

The electron conductive rubber material of the present invention is a semiconductive rubber composition or the like containing electron conductive particles such as a conductive carbon black.

The raw rubber B used as the electron conductive rubber material is not specifically limited as long as the polymeric dispersed phase can be formed by blending with the raw rubber A in a predetermined ratio; however, the solubility parameter (SP value) of the raw rubber B is preferably less than 17.8 $(MPa)^{1/2}$.

In addition, it is preferable that the raw rubber A be a polar rubber, the raw rubber B be incompatible with the raw rubber A, and the SP value of the raw rubber B be not more than that of the raw rubber A.

In the case in which two different rubbers are blended with each other, even though to some extent depending on the blending conditions, when the difference in SP value between the rubbers is increased, the incompatibility therebetween is increased, whereby the dispersed domain structure is stably formed.

Accordingly, when the raw rubber A is a polar rubber having a polar group therein, and the SP value thereof is 17.8 $(MPa)^{1/2}$ or more, the raw rubber B is preferably a nonpolar rubber having an SP value of less than 17.8 $(MPa)^{1/2}$.

In particular, the difference in SP value between the raw rubber A and the raw rubber B is preferably 1.0 $(MPa)^{1/2}$ or more. When rubbers having a difference in SP value of 1.0 $(MPa)^{1/2}$ or more therebetween are used, a stable dispersed domain structure can be formed.

In this connection, as the SP value described in the present invention, a value disclosed in literatures may be used, or a value may be obtained by molar attractions of atomic groups constituting a molecular from the molecular structure using a Small calculus. In addition, the SP value may be experimentally obtained by a viscosity method, a swelling method, or a gas chromatographic method.

As a preferable example of the raw rubber B, there may be mentioned a natural rubber (NR), an isoprene rubber (IR), a butadiene rubber (BR), a styrene-butadiene rubber (SBR), a butyl rubber (IIR), an ethylene-propylene rubber (EPM), an ethylene-propylene-diene terpolymeric rubber (EPDM), or a silicone rubber.

In view of the points described above, as a preferable example of the raw rubber A, there may be mentioned an epichlorohydrine homopolymer (CHC), an epichlorohydrine-ethyleneoxide copolymer (CHR), an epichlorohydrine-ethyleneoxide-allylglycidylether terpolymer (CHR-AGE), or a hydrogenated acrylonitrile-butadiene copolymer (H-NBR). In addition, the raw rubber A mentioned above is preferably used in combination with the raw rubber B, such as a natural rubber (NR), an isoprene rubber (IR), a butadiene rubber (BR), a styrene-butadiene rubber (SBR), a butyl rubber (IIR), an ethylene-propylene rubber (EPM), or an ethylene-propylene-diene terpolymeric rubber (EPDM).

Since superior aging resistance and covulcanization properties can be obtained, a combination of an epichlorohydrine-ethyleneoxide-allylglycidylether terpolymer (CHR-AGE) with an ethylene-propylene-diene terpolymeric rubber (EPDM) is most preferable.

The conductive particles added to the raw rubber B are an electron conductive agent, and for example, a carbon black, graphite, an oxide such as titanium oxide or tin oxide, a metal such as Cu or Ag, or conductive particles covered with an oxide or a metal may be mentioned. In addition, when necessary, at least two types of conductive particles mentioned above may be used in combination at an appropriate mixing ratio in some cases.

In general, the raw rubber B preferably has an intrinsic volume resistivity of $1 \times 10^{14}$ Ω·cm or more.

In addition, in general, the content of the conductive particles is preferably 1 to 200 parts by weight with respect to 100 parts by weight of the raw rubber B.

Among the conductive agents described above, in view of high conducting efficiency, high affinity to rubbers, and the like, conductive particles primarily composed of a conductive carbon black is preferable.

In general, carbon black has a tufted highly ordered configuration formed of aggregated primary particles having an average particle diameter of 10 to 50 nm. This tufted highly ordered configuration is called a structure, and the level of the structure can be quantitatively represented by the DBP oil absorption ($cm^3/100$ g). The DBP oil absorption ($cm^3/100$ g) indicates a volume of dibutyl phthalate adsorbed to 100 g of a carbon black and is measured in accordance with Japan Industrial Standard (JIS) K 6217. A larger DBP oil adsorption indicates a well-grown structure having a higher conducting efficiency. The average particle diameter of a carbon black can be determined by observation using a transmission electron microscope (TEM) in accordance with American Society of Testing Materials (ASTM) D3849–89.

The DBP oil absorption of the conductive carbon black used in the present invention is preferably 110 $cm^3/100$ g or more, is more preferably 130 $cm^3/100$ g or more, and is even more preferably 150 $cm^3/100$ g or more. As described above, since a conductive carbon black having a larger DBP oil absorption has a highly grown structure, the carbon black can be discriminated from other fillers such as a reinforcing carbon black. In this connection, the DBP oil absorption of a reinforcing carbon black is generally less than 110 $cm^3/100$ g.

As a carbon black having the properties described above, an acetylene black, Ketjen Black (Ketjen Black International Co., Ltd.), Denka Black (Denki Kagaku Kogyo K.K.), Asahi HS-500 (Asahi Carbon Co., Ltd.), Valcan XC72 (Cabot Corporation), or the like may be mentioned. Among these carbon blacks mentioned above, Ketjen Black is preferably used since an increase in hardness of an elastic layer can be suppressed because conductivity can be obtained by a small addition amount of Ketjen Black.

A relatively large amount of the conductive carbon black, such as 5 to 100 parts by weight, is preferably added to 100 parts by weight of the raw rubber B. The electrical resistance is decreased by adding a large amount of the carbon black, and as a result, the variation in conductivity of the polymeric dispersed phase and the voltage dependence of the conductivity can be decreased. In addition, since the resistance control is performed by adjusting the ratio of the polymeric dispersed phase, the polymeric dispersed phase is formed of a rubber having an electrical resistance lower than that of the polymeric continuous phase. As measurement of the electrical resistances for individual phases, the electrical resistances of the rubber materials forming the individual phases are measured. Alternatively, by using an ultra-thin piece made of a finally obtained semiconductive composition, a current flowing between a cantilever and an electrode is measured in accordance with a simultaneous current measurement method using a scanning probe microscope (SPM), and hence, the electrical resistance of each polymeric phase may be obtained.

In the present invention, the only polymeric dispersed phase must substantially have electrical conductivity imparted by the conductive particles contained therein, and hence, the conductive particles must be localized in the polymeric dispersed phase. From this point of view, conductive particles having a higher affinity to the raw rubber B are preferably added thereto.

In addition, when conductive particles such as a conductive carbon black are added to a mixture composed of two different polymers, even though to some extent depending on the viscosity of each polymer and on the affinity to the conductive particles, the conductive particles are generally localized in a polymer having a higher SP value. Accordingly, when a method for mixing conductive particles with a rubber composition formed beforehand by blending the raw rubber A and the raw rubber B, or a method for simultaneously mixing the raw rubber A, the raw rubber B, and the conductive particles all together is employed, the conductive particles are likely to localize in the raw rubber A having a higher SP value.

In the present invention, in the polymeric dispersed phase containing the raw rubber B having a low SP value, the conductive particles such as a conductive carbon black must be localized.

Accordingly, a method for forming a semiconductive rubber composition is effectively performed by steps of preparing a master batch in which conductive particles, such as a conductive carbon black, are added only to the raw rubber B, and subsequently blending the master batch thus formed with the raw rubber A.

That is, by preparing an electron conductive rubber material composed of the raw rubber B mixed with the conductive particles and by blending the electron conductive rubber composition thus formed and an ion conductive rubber composition, a semiconductive rubber composition containing the conductive particles localized in the polymeric dispersed phase can be produced.

In this connection, as the blending method, a method using a closed type mixer, such as a Banbary mixer or a pressure kneader; a method using an open type mixer such as an open roller; and the like may be mentioned by way of example.

In addition, the dispersed domain structure of the obtained semiconductive rubber composition, the state in which the conductive particles are localized, and the like can be observed by using a transmission electron microscope (TEM). In particular, a conductive carbon black has a highly-grown structure compared to that of a reinforcing carbon black, and hence, the conductive carbon black can be discriminated from the reinforcing carbon black and other fillers.

In the present invention, a state in which the conductive particles are present only in the polymeric dispersed phase is most preferable. However, even when a method is used in which a master batch formed by adding conductive particles only to the raw rubber B contained in the polymeric dispersed phase is prepared beforehand, and the master batch thus obtained is blended with the raw rubber A forming the polymeric continuous phase, a phenomenon is observed in which a small amount of the conductive particles is transferred to the polymeric continuous phase.

In the present invention, the conductive particles may be present in the polymeric continuous phase as long as the content of the conductive particles therein does not practically contribute to the conductive properties. As the content of the conductive particles in the polymeric continuous phase, which does not contribute to the conductive properties, the amount of the conductive particles per unit volume of the polymeric dispersed phase is preferably two times or more the amount thereof per unit volume of the polymeric continuous phase, and is more preferably five times or more.

In order to reliably form the dispersed domain structure composed of the polymeric continuous phase containing the raw rubber A and the polymeric dispersed phase containing the raw rubber B, the viscosities of the raw rubber A and the raw rubber B, the blending ratio thereof, and the like are important. When two different polymers incompatible to each other are blended with each other, a polymer having a higher volume ratio tends to form a continuous layer, and a polymer having a lower viscosity tends to form a continuous layer.

In the present invention, before the raw rubber A and the raw rubber B are blended with each other, an electron conductive rubber material is formed by adding the conductive particles to the raw rubber B. Accordingly, the viscosity of the electron conductive rubber material becomes higher than that of the raw rubber B, and as a result, the electron conductive rubber material is likely to form a polymeric dispersed phase. In particular, when the blending ratio of the electron conductive material is high, the viscosity of the electron conductive material is preferably higher than that of the raw rubber A or than that of the ion conductive rubber material.

In addition, the blending ratio of the raw rubber A to the raw rubber B, that is, the raw rubber A/the raw rubber B, (on a weight basis) is preferably in the range of from 95/5 to 40/60, and in order to form a stable dispersed domain structure, the difference in viscosity between the two raw rubbers is more preferably 5 to 60 points measured by a Mooney viscometer (ML1+4) at 100° C.

As described above, according to the present invention, the semiconductive rubber composition is provided in which the electrical properties are uniform, are not influenced by environmental changes in temperature, humidity, and the like, and are stable with time. In addition, in the semiconductive rubber composition, contamination of the member to be charged, such as a photosensitive member, is suppressed. Consequently, the semiconductive rubber composition described above can be preferably used for forming an elastic layer of a conductive member, such as a developing roller, a charging roller, or a transfer roller, for use in an electrophotographic apparatus and the like.

In order to uniformly charge the member to be charged, the elastic layer of the charging member preferably has uniform semiconductive properties, and in addition to this, in order to ensure uniform contact to the photosensitive member, the elastic layer preferably has a low hardness.

In general, a plasticizer is used in order to obtain an elastic layer having a low hardness; however, when a large amount of the plasticizer is used, a photosensitive member may be contaminated by blooming of this plasticizer on the surface of the elastic layer in some cases. In particular, since the raw rubber A forming the polymeric continuous phase is a polymer having a high resistance against oil and a low oil swelling property, blooming of the plasticizer is likely to occur. However, in the present invention, a large amount of plasticizer can be added to the raw rubber B forming the polymeric dispersed phase. As a result, the blooming of the plasticizer added to the polymeric dispersed phase on the surface of the elastic layer can be suppressed by the oil barrier effect of the polymeric continuous phase having a high resistance against oil.

Accordingly, in the present invention, even when an elastic layer having a low hardness is formed by adding a large amount of a plasticizer, contamination or the like of the photosensitive member is preferably suppressed. As the plasticizer, for examples, paraffin oil, naphthene oil, aroma oil may be mentioned, and 5 to 200 parts by weight of the plasticizer described above may be added to 100 parts by weight of the raw rubber B.

As described above, the elastic layer preferably has a JIS-A hardness of 60° or less.

In addition, compounding agents generally used for rubbers, such as a filler, a processing aid, an auxiliary cross-linking agent, a cross-linking promoter, an auxiliary cross-linking promoter, a cross-linking retardant, a tackifier, a dispersing agent, a foaming agent, and the like may be added to individual polymeric phases when necessary.

Figure 2:
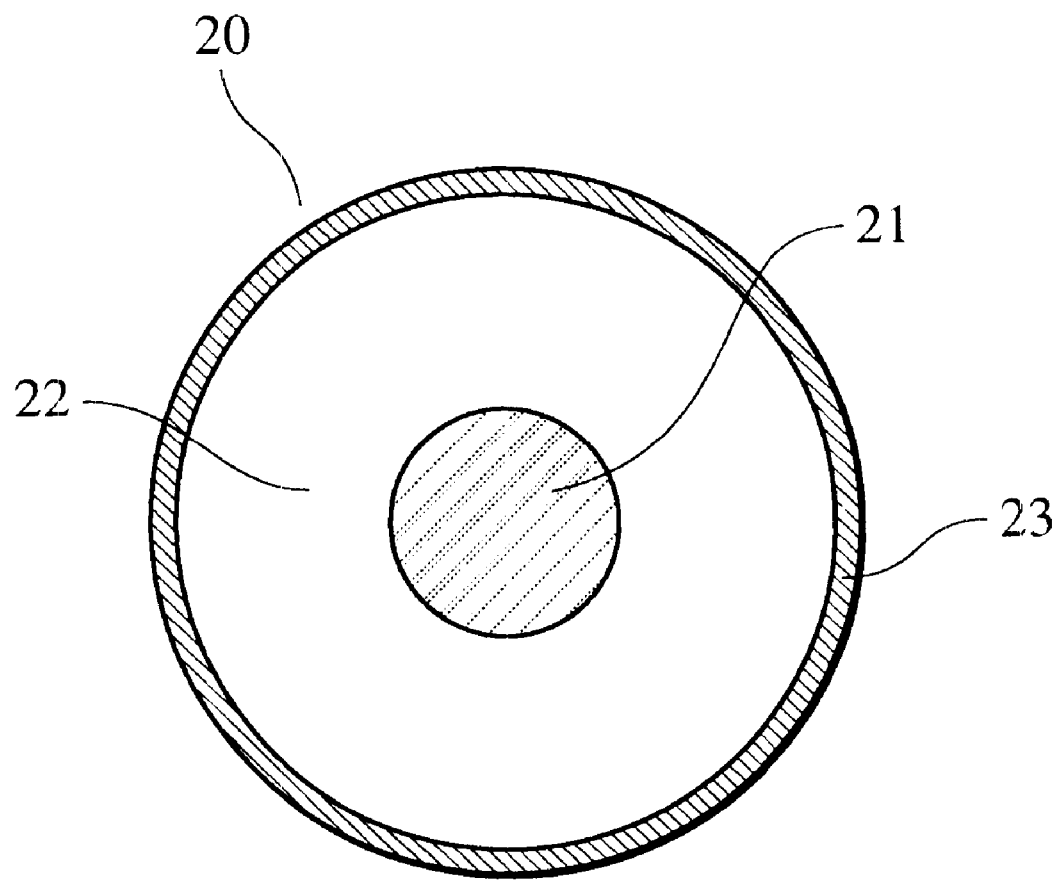
FIG. 2 is a schematic cross-sectional view for illustrating an example of a charging roller according to the present invention.

In FIG. 2, as an example of the conductive member of the present invention, the structure of a charging roller 20 is shown, in which an elastic layer 22 and a surface-covering layer 23 are sequentially laminated in this order around the periphery of a metal shaft 21.

As a method for forming the elastic layer, for example, there may be mentioned a method comprising steps of forming an unvulcanized semiconductive rubber composition in the form of a tube by using an extruder, vulcanizing the semiconductive rubber composition thus extruded in a vulcanizing oven, press-fitting a metal shaft in the vulcanized rubber composition, and polishing the surface thereof so as to have a predetermined outside diameter; or a method comprising steps of vulcanizing a semiconductive rubber composition, co-extruding the vulcanized rubber composition with a metal shaft placed at the center thereof to form a cylindrical shape by an extruder provided with a crosshead, and heating the co-extruded material placed in a die so as to form a molded part having a predetermined outside diameter.

Figure 4:
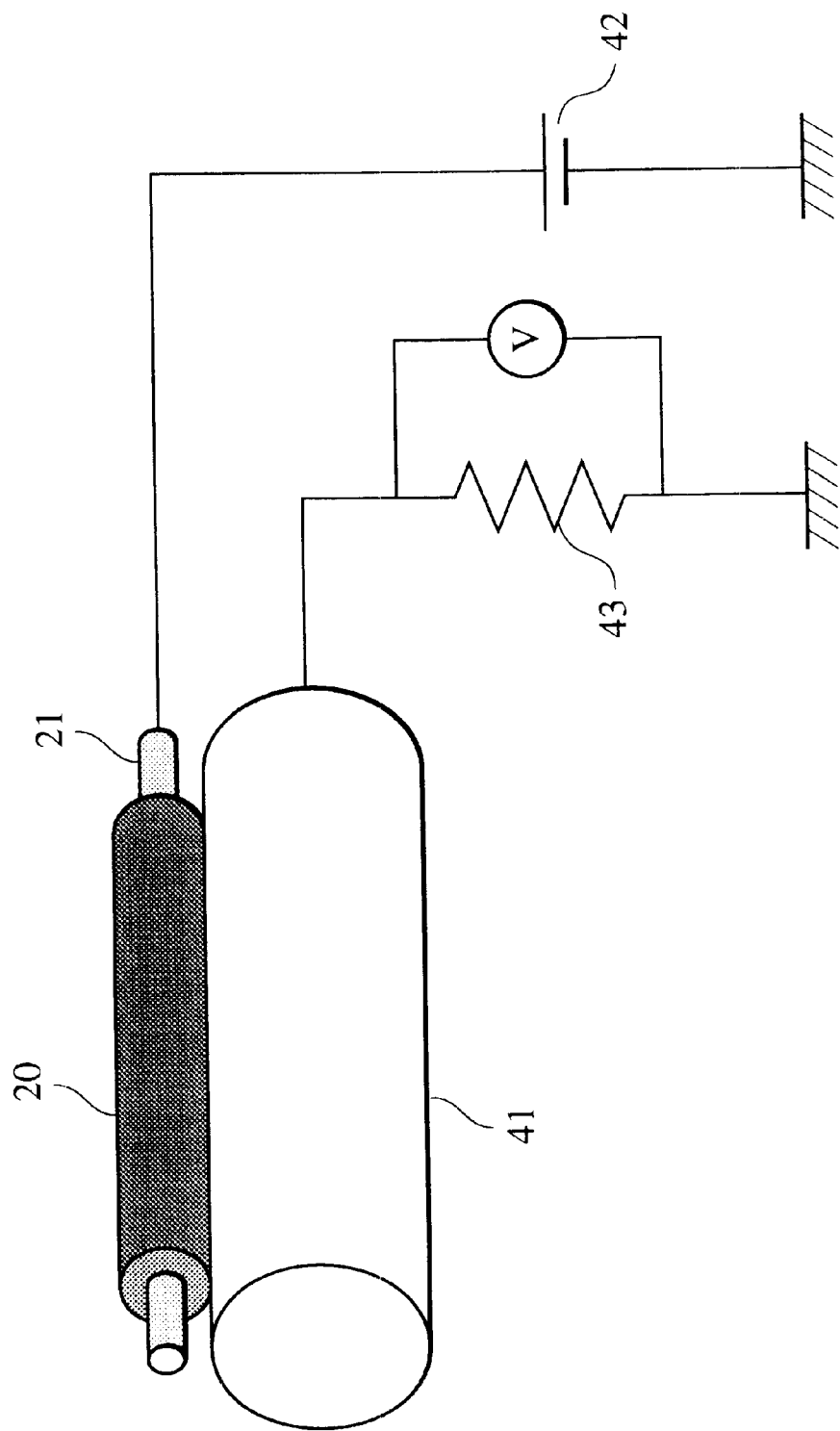
FIG. 4 is a schematic view for illustrating an apparatus measuring an intrinsic volume resistivity.

FIG. 4 is a schematic view showing a measurement apparatus for measuring the electrical resistance of a charging roller. The charging roller 20 is in press-contact with a cylindrical aluminum drum 41 by pressing the two ends of the metal shaft 21 using pressing means (not shown) and is rotatably driven by the rotation of the aluminum drum 41. In the state described above, a DC voltage is applied to the metal shaft 21 of the charging roller 20 using an external power source 42, and the electrical resistance of the charging roller 20 can be obtained from a voltage applied to a standard resistance 43 connected to the aluminum drum 41 in series.

The electrical resistance of the elastic layer of the charging roller when 100 V is applied under the conditions (represented by L/L conditions in some cases) of a temperature of 15° C. and a relative humidity (R. H.) of 10% is preferably $1 \times 10^3$ to $1 \times 10^9$ Ω so as to be able to apply a charging bias voltage to the photosensitive member.

By measuring the maximum and the minimum electrical resistances when the charging roller is rotated by one turn, the uniformity of the electrical properties of the elastic layer can be represented by a peripheral variation in electrical resistance, i.e., the maximum/the minimum electrical resistance, as an index. The peripheral variation in the electrical resistance described above is preferably 1.5 or less.

In addition, after the electrical resistance of the elastic layer is measured when 100 V is applied under the conditions (represented by H/H conditions in some cases) of a temperature of 32.5° C. and a relative humidity (R. H) of 80%, the electrical resistances measured under the L/L conditions and under the H/H conditions are represented by a common logarithm, and hence, the difference in the values thus obtained can be used as an index indicating the environmental dependence of the electrical resistance. The environmental dependence is preferably 1.0 or less.

In addition, after the electrical resistances of the elastic layer is measured when 25 V is applied under the L/L conditions, the electrical resistances measured at 25 V and 100 V under the L/L conditions are represented by a common logarithm, and hence, the difference in the values thus obtained can be used as an index indicating the voltage dependence of the electrical resistance of the elastic layer. The voltage dependence is preferably 0.5 or less.

A surface-covering layer is preferably formed on the surface of the elastic layer having the properties described above.

The surface-covering layer is to prevent the charging member and the photosensitive member from being damaged by a charging current concentrated thereat when defects such as a pinhole are formed in the photosensitive member, and an electrical resistance of approximately $1\times10^6$ to $1\times10^{10}$ $\Omega$ is required for the surface-covering layer. As the surface-covering layer, a binder polymer, such as an acrylic resin, a polyurethane resin, a polyamide resin, a polyester resin, a polyolefin resin, or a silicone resin, is mixed with an appropriate amount of a carbon black, graphite, an oxide such as titanium oxide or tin oxide, a metal such as Cu or Ag, conductive particles composed of particles covered with an oxide or a metal, or an ionic electrolyte, such as $LiClO_4$, KSCN, NaSCN, $LiCF_3SO_3$, or the like, so as to have a predetermined electrical resistance.

As a method for forming the surface-covering layer, for example, there may be mentioned a method comprising steps of dissolving or dispersing the binder polymer described above in a solvent, dispersing a conductive filler in the solvent described above, and coating the surface of the elastic layer with the mixture containing the conductive filler by a coating method, such as dipping, beam coating, or a roller coating; and a method comprising steps of compounding the binder polymer and a conductive filler, forming a cylindrical part from the compound thus formed by using an extruder or the like, and covering the elastic layer by the cylindrical part.

In addition to the elastic layer and the surface-covering layer, the charging roller of the present invention may be provided a functional layer, such as an adhesive layer, a diffusion barrier layer, an underlying layer, or a primer layer when necessary.

Figure 3:
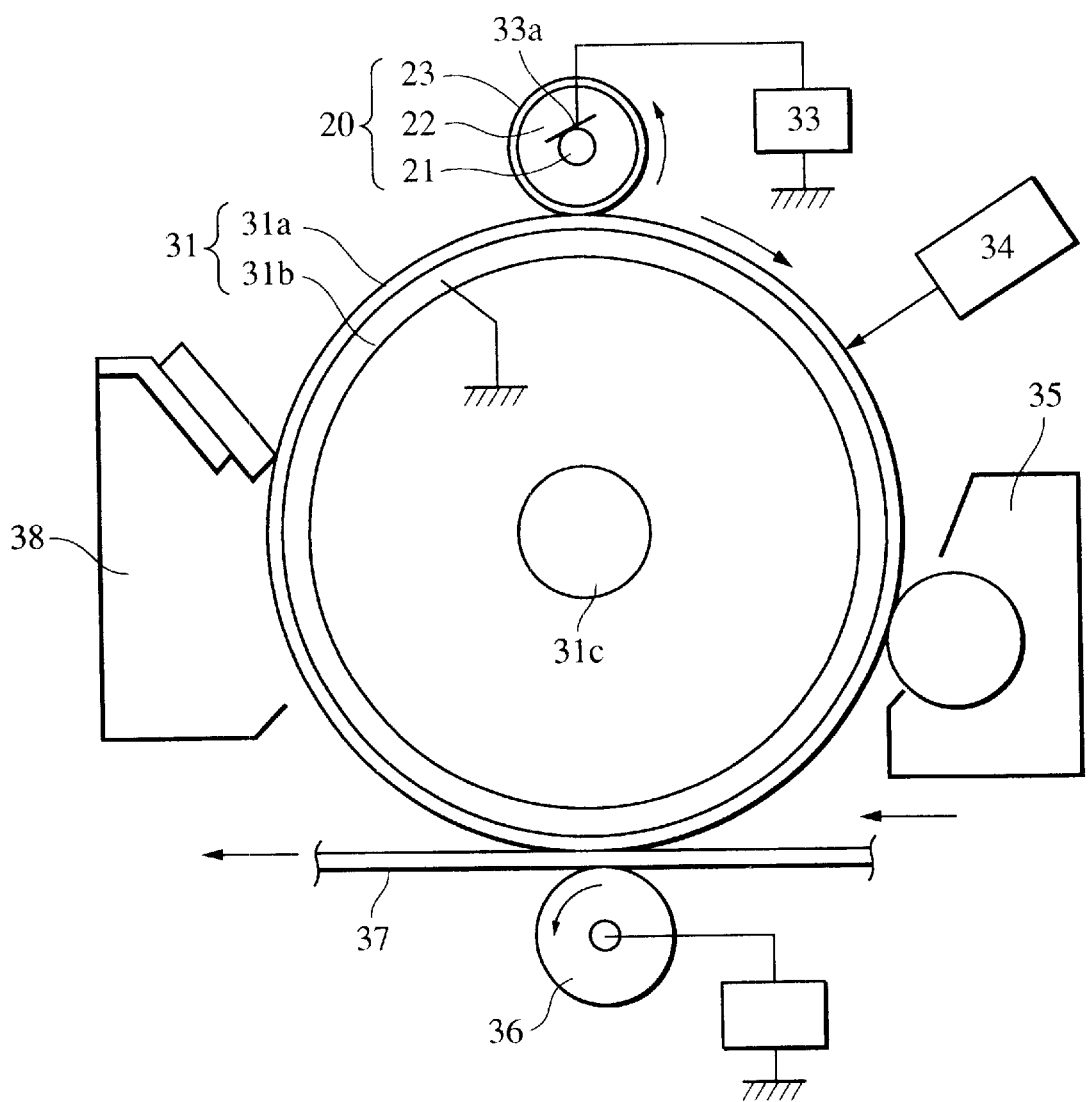
FIG. 3 is a schematic cross-sectional view for illustrating an example of an electrophotographic apparatus according to the present invention.

FIG. 3 is a schematic view showing the structure of an electrophotographic apparatus provided with the charging member of the present invention. Reference numeral 31 indicates an image supporting member (a photosensitive member) as a member to be charged, and in this embodiment, the image supporting member is a drum type electrophotographic photosensitive member comprising a conductive supporting member 31*b* and a photosensitive layer 31*a* as an elemental layer formed around the periphery thereof. The image supporting member 31 is rotatably driven around a supporting shaft 31*c* in the clockwise direction in the figure at a predetermined peripheral speed.

Reference numeral 20 indicates a charging member in contact with the surface of the photosensitive member 31 for performing a primary charging treatment so as to uniformly impart a predetermined polarity and a potential to the surface of the photosensitive member 31, and in this embodiment, a roller type charging member is used. The charging roller 20 comprises a central metal shaft 21, an elastic layer 22 formed around the periphery thereof as a bottom layer, and a surface-covering layer 23 formed around the periphery of the elastic layer 22 as a top layer. The charging roller 20 is press-contacted to the photosensitive member 31 by pressing the two ends of the metal shaft 21 using pressing means (not shown) so as to be rotatably driven with the rotation of the photosensitive member 31.

Subsequently, a predetermined DC bias or a predetermined DC+AC bias is applied to the metal shaft 21 by a power supply 33 via brush electrodes 33*a*, and hence, the periphery of the rotatable photosensitive member 31 is charged to have a predetermined polarity at a predetermined potential by contact charging. Objective image information is then exposed on the surface of the photosensitive member 31, uniformly processed by the charging treatment using the charging member 20, by exposing means 34 (laser beam scanning exposure, slit exposure of original images, and the like), and as a result, an electrostatic latent image corresponding to the objective image information is formed on the periphery of the photosensitive member 31.

When the electrophotographic apparatus is used as a printer for a copying machine, an exposure of an optical image is performed by scanning light reflected from the original document or light transmitted therethrough, scanning laser beams in accordance with reading signals translated from the original document, driving an LED array, driving a liquid crystal shutter array, or the like.

Next, visible images are sequentially formed from the obtained latent images as toner images by developing means 35. These toner images is then sequentially transferred by transfer means 36 to the surfaces of transfer members 37 transported from paper supply means (not shown) to a transfer portion located between the photosensitive member 31 and the transfer means 36 at an appropriate timing synchronized with the rotation of photosensitive member 31. The transfer means 36 of this embodiment is a transfer roller, and by performing charging having a polarity opposite to that of the toner on the backside of the transfer member 37, the toner image at the photosensitive member 31 side is transferred on the front side of the transfer member 37.

The transfer member 37 receiving the transfer of the toner image is separated from the surface of the photosensitive member 31, is transported to image fixing means (not shown) for image fixing, and is output as an image forming material. In addition, when an image is formed on the backside of the transfer member 37, the transfer member 37 is transported to re-transport means for re-transporting the transfer member 37 to the transfer portion.

After the image is transferred from the photosensitive member 31, contaminants, such as a residual toner after transfer, adhered to the surface thereof is removed by cleaning means 38, and the photosensitive member 31 is then repeatedly used for forming images.

In addition to the charging roller 20 shown in FIG. 3, as charging treatment means for the image supporting member 31, a charging member, such as a blade type, a block type, or a belt type member, may be used.

The charging roller 20 may be rotatably driven by a photosensitive member 31 which is driven linearly, may be non-rotatable, or may be rotatably driven by itself in the direction corresponding to the direction in which the photosensitive member 31 is driven linearly or in the direction opposite thereto.

By using the charging member of the present invention, such as the charging roller 20, as a charging member for charging a photosensitive member, an electrophotographic apparatus having superior performances can be manufactured.

In addition, by using the charging member of the present invention, such as the transfer means 36, as a transfer charging member, an electrophotographic apparatus having superior performances can be manufactured.

Furthermore, the charging member of the present invention may be used as a transport member such as a paper supply roller in addition to a transfer charging member, a primary charging member, and a discharging member.

As an electrophotographic apparatus preferably using the charging member of the present invention, there may be mentioned a copying machine, a laser beam printer, an LED printer, or an electrophotographic application apparatus such as an electrophotographic printing system.

In the present invention, as shown in FIG. 3, a plurality of elements for constituting an electrophotographic apparatus, such as a photosensitive member, a charging member, a developing means, and cleaning means, may be integrally assembled in a process cartridge. Accordingly, the process cartridge can be detachably mounted to the main apparatus. For example, when the charging member of the present invention and at least one of the developing means and the cleaning means are integrally assembled in a process cartridge together with the photosensitive member, the process cartridge can be detachably mounted to the main apparatus using guide means such as rails provided therefor.

EXAMPLES

Hereinafter, the present invention will be described in detail with reference to examples; however, the present invention is not limited to these examples. In this connection, "parts" means "parts by weight" unless particularly stated otherwise, and chemical reagents used in these examples are commercially available high-purity chemical reagents unless stated otherwise.

Example 1

Rubber Roller 1, Charging Roller 1

By using a pressure kneader, a master batch 1 was formed by kneading 100 parts of an ethylene-propylene-diene terpolymer (EPT 4045 manufactured by Mitsui Sekiyu Kagaku Kogyo Co., Ltd) as the raw rubber B, 10 parts of Ketjen Black (Ketjen Black EC600JD manufactured by Ketjen Black International Co., Ltd.) as the conductive particles, 30 parts of a paraffin oil (PW-380 manufactured by Idemitsu Kosan Co., Ltd.) as a softening agent, and 1 part of stearic acid as a processing aid.

The DBP oil absorption of Ketjen Black was 495 $cm^3/100$ g, the intrinsic volume resistivity of the raw rubber B was $1\times10^{16}$ $\Omega\cdot cm$, and the SP value thereof was 16.4 $(MPa)^{1/2}$.

Next, by using an open roll, an unvulcanized rubber composition was formed by kneading 75 parts of an epichlorohydrine-ethyleneoxide-allylglycidylether terpolymer (Epichlomer CG manufactured by Daiso Co., Ltd.) as the raw rubber A, 1 part of stearic acid as a processing aid, 35.25 parts of the master batch 1, 2.5 parts of 2,5-dimethyl-2,5-di(t-butylperoxy)hexyne (Perhexa 25B-40 manufactured by NOF Corporation) as a vulcanizing agent, and 1.5 parts of triallyl isocyanurate (TAIC-M60 manufactured by Nippon Kasei Chemical Company) as an auxiliary cross-linking agent.

The intrinsic volume resistivity of the raw rubber A was $3.0\times10^8$ $\Omega\cdot cm$, and the SP value thereof was 18.5 $(MPa)^{1/2}$.

The obtained unvulcanized rubber composition was extruded with a metal shaft (6 mm in diameter, 240 mm long) concentrically disposed at the center to form a cylindrical shape by an extruder provided with a crosshead, the ends of the extruded rubber was cut away to form a shape so as to be charged in a die. The extruded rubber having the chargeable shape, which is integral with the metal shaft, was fixed in a molding die (15 mm in inner diameter), and press-vulcanization was performed at 180° C. for 15 minutes. After the molded integral part is removed from the die, a secondary vulcanization was performed at 180° C. for 30 minutes in an electric furnace. Subsequently, the surface of the vulcanized rubber was polished, thereby forming a rubber roller 1 having an elastic layer 3 mm thick. The elastic layer of the rubber roller 1 had a JIS-A hardness of 52°.

From the rubber roller 1 thus formed, an ultra-thin piece approximately 0.1 μm thick was formed, and the dispersion states of the polymer and the conductive particles were observed using TEM. According to the results, it was confirmed that the epichlorohydrine-ethyleneoxide-allylglycidylether terpolymer and the ethylene-propylene-diene terpolymer formed a polymeric continuous phase and a polymeric dispersed phase, respectively, and that the Ketjen Black was present only in the polymeric dispersed phase.

Next, the electrical properties of the rubber roller 1 were measured. According to the results, the electrical resistance was $1.8\times10^5$ $\Omega$ at 25 V and $9.0\times10^4$ $\Omega$ at 100 under the L/L conditions, and the peripheral variation was 1.3 times. In addition, the electrical resistance was $3.5\times10^4$ $\Omega$ under the H/H conditions, the environmental dependence was 0.4, and the voltage dependence was 0.3.

Next, the rubber roller 1 was processed by a silane coupling agent. A paint was then formed by adding a slurry containing conductive tin oxide dispersed in an aqueous solution at a pH of 5.5 by exploiting the electrical repulsion at the interface thereof to an aqueous solution containing a polyurethane dispersed therein so that the solid content of the slurry corresponds to 40 wt % of that of the paint, and the rubber roller 1 processed by the silane coupling agent was coated with the paint thus formed by dipping, whereby a film having a thickness of 60 μm was formed. The rubber roller 1 provided with the coating film thereon was heated to 120° C. for 30 minutes for drying in an electric furnace, and the two ends of the rubber roller 1 was cut so as to form a charging roller 1 having a rubber length of 224 mm.

The charging roller 1 thus formed was assembled in a process cartridge (press-contacted to a photosensitive member 30 mm in diameter with a loading of 5 N at both ends of the roller), and was then held under the conditions of a temperature of 40° C. and a relative humidity of 95% for 30 days. Subsequently, the process cartridge thus processed was mounted to an electrophotographic apparatus (Lasershot LBP-320 manufactured by Canon Kabushiki Kaisha), and image forming was then performed. According to the results, transfer of contaminants from the charging roller 1 to the photosensitive member was not observed, and an image having superior quality could be obtained.

Example 2

Rubber Roller 2, Charging Roller 2

By using a pressure kneader, a master batch 2 was formed by kneading 90 parts of an epichlorohydrine-ethyleneoxideallylglycidylether terpolymer (Gerchron 3106 manufactured by Nippon Zeon Co., Ltd.) as the raw rubber A, 10 parts of a liquid NBR (N280 manufactured by JSR Corp.), 20 parts of SRF Carbon Black (Asahi#35 manufactured by Asahi Carbon Co., Ltd.) as a reinforcing agent, and 1 part of stearic acid as a processing aid.

The intrinsic volume resistivity of the raw rubber A was $9.0 \times 10^7$ Ω·cm, and the SP value thereof was 18.6 $(MPa)^{1/2}$.

Next, by using an open roll, an unvulcanized rubber composition was formed by kneading 28.2 parts of the master batch 1, 96.8 parts of the master batch 2, 2.5 parts of 2,5-dimethyl-2,5-di(t-butylperoxy)hexyne (Perhexa 25B-40 manufactured by NOF Corporation) as a vulcanizing agent, and 1.5 parts of triallyl isocyanurate (TAIC-M60 manufactured by Nippon Kasei Chemical Company) as an auxiliary cross-linking agent.

By using this unvulcanized rubber composition, a rubber roller 2 was formed in a manner equivalent to that for the rubber roller 1, and the dispersing states of the polymers and the conductive particles were observed by using TEM. According to the results, it was confirmed that a material of the epichlorohydrine-ethyleneoxide-allylglycidylether terpolymer blended with the liquid NBR and the ethylene-propylene-diene terpolymer formed a polymeric continuous phase and a polymeric dispersed phase, respectively. In addition, the Ketjen Black used as the conductive particles could be discriminated from the SRF Carbon used as the reinforcing agent by the shapes thereof by the observation using TEM, and it was confirmed that the Ketjen Black was present only in the polymeric dispersed phase.

In addition, as was the case of the rubber roller 1, the hardness and the electrical properties of the elastic layer of the rubber roller 2 were measured. According to the results, the hardness was a JIS-A hardness of 49°, the electrical resistance was $1.2 \times 10^5$ Ω at 25 V and $6.0 \times 10^4$ Ω at 100 V under the L/L conditions, and the peripheral variation was 1.2 times. In addition, the electrical resistance was $2.5 \times 10^4$ Ω under the H/H conditions, the environmental dependence was 0.4, and the voltage dependence was 0.3.

Furthermore, as was the case of the rubber roller 1, a charging roller 2 was formed by coating the surface of the elastic layer of the rubber roller 2. This charging roller 2 was assembled in a process cartridge and was held under the conditions of a temperature of 40° C. and a relative humidity of 95% for 30 days. Subsequently, the charging the process cartridge was mounted to the electrophotographic apparatus, and image forming was then performed. According to the results, transfer of contaminants from the charging roller 2 to the photosensitive member was not observed, and an image having superior quality could be obtained.

Example 3

Rubber Roller 3, Charging Roller 3

By using an open roll, an unvulcanized rubber composition was formed by kneading 49.35 parts of the master batch 1, 78.65 parts of the master batch 2, 5 parts of 2,5-dimethyl-2,5-di(t-butylperoxy)hexyne (Perhexa 25B-40 manufactured by NOF Corporation) as a vulcanizing agnet, and 3 parts of triallyl isocyanurate (TAIC-M60 manufactured by Nippon Kasei Chemical Company) as an auxiliary cross-linking agent.

By using this unvulcanized rubber composition, a rubber roller 3 was formed in a manner equivalent to that for the rubber roller 1, and dispersing states of the polymers and the conductive particles were observed by using TEM. According to the results, it was confirmed that the material of the epichlorohydrine-ethyleneoxide-allylglycidylether terpolymer blended with the NBR and the ethylene-propylene-diene terpolymer formed a polymeric continuous phase and a polymeric dispersed phase, respectively. In addition, it was confirmed that the Ketjen Black was present only in the polymeric dispersed phase.

In addition, as was the case of the rubber roller 1, the hardness and the electrical properties of the elastic layer of the rubber roller 3 were measured. According to the results, the hardness was a JIS-A hardness of 51°, the electrical resistance was $2.0 \times 10^5$ Ω at 25 V and $8.0 \times 10^4$ Ω at 100 V under the L/L conditions, and the peripheral variation was 1.2 times. In addition, the electrical resistance was $4.0 \times 10^4$ Ω under the H/H conditions, the environmental dependence was 0.3, and the voltage dependence was 0.4.

Furthermore, as was the case of the rubber roller 1, a charging roller 3 was formed by coating the surface of the elastic layer of the rubber roller 3. This charging roller 3 thus obtained was assembled in a process cartridge and was held under the conditions of a temperature of 40° C. and a relative humidity of 95% for 30 days. Subsequently, the process cartridge was mounted to the electrophotographic apparatus, and image forming was then performed. According to the results, transfer of contaminants from the charging roller 3 to the photosensitive member was not observed, and an image having superior quality could be obtained.

Example 4

Rubber Roller 4, Charging Roller 4

By using a pressure kneader, a master batch 3 was formed by kneading 100 parts of an ethylene-propylene-diene terpolymer (EPT 4045 manufactured by Mitsui Sekiyu Kagaku Kogyo Co., Ltd) as the raw rubber B, 12 parts of Ketjen Black (Ketjen Black EC600JD manufactured by Ketjen Black International Co., Ltd.) as the conductive particles, 30 parts of a paraffin oil (PW-380 manufactured by Idemitsu Kosan Co., Ltd.) as a softening agent, 1 part of stearic acid as a processing aid, and 5 part of zinc oxide.

Next, by using an open roll, an unvulcanized rubber composition was formed by kneading 65 parts of an acrylonitrile-butadiene copolymer (N230SV manufactured by JSR Corp.) as the raw rubber A, 1 part of stearic acid as a processing aid, 3 parts of zinc oxide, 0.5 parts of lithium perchlorate as an ion conductive agent, 51.80 parts of master batch 3, 0.5 parts of sulfur as a vilcanizing agent, 1.5 parts of tetramethylthiuram disulfide (Nocceler-TT manufactured by Ouchishinko Chemical Industrial Co., Ltd.), and 2.0 parts of N-cyclohexyl-2-benzothiazolyl sulfene amide (Nocceler-CZ manufactured by Ouchishinko Chemical Industrial Co., Ltd.).

The intrinsic volume resistivity of the raw rubber A was $7.0 \times 10^{10}$ Ω·cm, and the SP value thereof was 20.3 $(MPa)^{1/2}$.

By using this unvulcanized rubber composition, a rubber roller 4 was formed in a manner equivalent to that for the rubber roller 1, and dispersing states of the polymers and the conductive particles were observed by using TEM. According to the results, it was confirmed that the acrylonitrile-butadiene copolymer and the ethylene-propylene-diene terpolymer formed a polymeric continuous phase and a polymeric dispersed phase, respectively. In addition, it was confirmed that the Ketjen Black was present only in the polymeric dispersed phase.

In addition, as was the case of the rubber roller 1, the hardness and the electrical properties of the elastic layer of the rubber roller 4 were measured. According to the results, the hardness was a JIS-A hardness of 53°, the electrical resistance was $1.5 \times 10^6$ Ω at 25 V and $6.0 \times 10^5$ Ω at 100 V under the L/L conditions, and the peripheral variation was 1.3 times. In addition, the electrical resistance was $3.0 \times 10^5$ Ω under the H/H conditions, the environmental dependence was 0.3, and the voltage dependence was 0.4.

Furthermore, as was the case of the rubber roller 1, a charging roller 4 was formed by coating the surface of the elastic layer of the rubber roller 4. This charging roller 4 thus obtained was assembled in a process cartridge and was held under the conditions of a temperature of 40° C. and a relative humidity of 95% for 30 days. Subsequently, the process cartridge was mounted to the electrophotographic apparatus, and image forming was then performed. According to the results, transfer-of contaminants from the charging roller 4 to the photosensitive member was not observed, and an image having superior quality could be obtained.

Comparative Example 1

Rubber Roller 5

By using a pressure kneader, a master batch 4 was formed by kneading 100 parts of an ethylene-propylene-diene terpolymer (EPT 4045 manufactured by Mitsui Sekiyu Kagaku Kogyo Co., Ltd) as the raw rubber B, 7 parts of Ketjen Black (Ketjen Black EC600JD manufactured by Ketjen Black International Co., Ltd.) as the conductive particles, 40 parts of SRF Carbon Black (Asahi#35 manufactured by Asahi Carbon Co., Ltd.) as a reinforcing agent, 50 parts of a paraffin oil (PW-380 manufactured by Idemitsu Kosan Co., Ltd.) as a softening agent, and 1 part of stearic acid as a processing aid.

Next, by using an open roll, an unvulcanized rubber composition was formed by kneading 198 parts of master batch 3, 7.5 parts of 2,5-dimethyl-2,5-di(t-butylperoxy)hexyne (Perhexa 25B-40 manufactured by NOF Corporation) as a vulcanizing agent, and 5 parts of triallyl isocyanurate (TAIC-M60 manufactured by Nippon Kasei Chemical Company) as an auxiliary cross-linking agent.

By using this unvulcanized rubber composition, a rubber roller 5 was formed in a manner equivalent to that for the rubber roller 1, and the hardness and the electrical properties of the elastic layer of the rubber roller 5 were measured. According to the results, the hardness was a JIS-A hardness of 47°, the electrical resistance was $7.0 \times 10^{10}$ Ω at 25 V and $1.0 \times 10^5$ Ω at 100 V under the L/L conditions, and the peripheral variation was 1.8 times. In addition, the electrical resistance was $7.0 \times 10^4$ Ω under the H/H conditions, the environmental dependence was 0.2, and the voltage dependence was 0.8.

As described above, in the case of the rubber roller 5, since the raw rubber A was not used, it was understood that, even though the environmental dependence was small, the peripheral variation and the voltage dependence were large.

Comparative Example 2

Rubber Roller 6

By using an open roll, an unvulcanized rubber composition was formed by kneading 100 parts of an epichlorohydrine-ethyleneoxide-allylglycidylether terpolymer (Epichlomer CG-102 manufactured by Daiso Co., Ltd.) as the raw rubber A, 1 part of stearic acid as a processing aid, 1 part of ethylene thiourea (Accel 22A manufactured by Kawaguchi Chemical Industry Co., Ltd.) as a vulcanization accelerator, 0.1 parts of sulfur as a vulcanizing agent, 3 parts of magnesium oxide as an acid receiving agent, and 3 parts of lithium perchlorate as an ion conductive agent.

By using this unvulcanized rubber composition, a rubber roller 6 was formed in a manner equivalent to that for the rubber roller 1, and the hardness and the electrical properties of the elastic layer of the rubber roller 6 were measured. According to the results, the hardness was a JIS-A hardness of 47°, the electrical resistance was $5.3 \times 10^5$ Ω at 25 V and $4.0 \times 10^5$ Ω at 100 V under the L/L conditions, and the peripheral variation was 1.1 times. In addition, the electrical resistance was $3.0 \times 10^4$ Ω under the H/H conditions, the environmental dependence was 1.1, and the voltage dependence was 0.1.

In addition, in a manner similar to that for the charging roller 1, the surface of the rubber roller 6 was coated, thereby forming a charging roller. The charging roller thus formed was assembled in a process cartridge and was held under the conditions of a temperature of 40° C. and a relative humidity of 95% for 30 days. Subsequently, the charging roller was mounted to the electrophotographic apparatus, and image forming was then performed. According to the results, image defects caused by transfer of contaminants from the charging roller to the photosensitive member were confirmed.

As described above, in the case of the rubber roller 6, since the raw rubber B was not used, and the ion conductive agent was used, it was understood that the environmental dependence was significant. In addition, when the charging roller formed of the rubber roller 6 was used, it was understood that the photosensitive member was contaminated, and hence, image defects might occur in some cases.

Comparative Example 3

Rubber Roller 7

By using an open roll, an unvulcanized rubber composition was formed by kneading 100 parts of an epichlorohydrine-ethyleneoxide-allylglycidylether terpolymer (Epichlomer CG manufactured by Daiso Co., Ltd.) as the raw rubber A, 1 part of stearic acid as a processing aid, 4 parts of Ketjen Black (Ketjen Black EC600JD manufactured by Ketjen Black International Co., Ltd.) as the conductive particles, 2.5 parts of 2,5-dimethyl-2,5-di(t-butylperoxy)hexyne (Perhexa 25B-40 manufactured by NOF Corporation) as a vulcanizing agent, and 1.5 parts of triallyl isocyanurate (TAIC-M60 manufactured by Nippon Kasei Chemical Company) as an auxiliary cross-linking agent.

By using this unvulcanized rubber composition, a rubber roller 7 was formed in a manner equivalent to that for the rubber roller 1, and the hardness and the electrical properties of the elastic layer of the rubber roller 7 were measured. According to the results, the hardness was a JIS-A hardness of 50°, the electrical resistance was $2.1 \times 10^5$ Ω at 25 V and $7.0 \times 10^4$ Ω at 100 V under the L/L conditions, and the peripheral variation was 1.7 times. In addition, the electrical resistance was $5.0 \times 10^4$ Ω under the H/H conditions, the environmental dependence was 0.1, and the voltage dependence was 0.5.

As described above, in the case of the rubber roller 7, since the raw rubber B was not used, it was understood that, even though the environmental dependence was small, the peripheral variation was significant.

Comparative Example 4

Rubber Roller 8

By using a pressure kneader, a master batch 5 was formed by kneading 200 parts of polynorbornen rubber (NORSOREX NSX20NB manufactured by Nippon Zeon Co., Ltd.) as the raw rubber B, 12 parts of Ketjen Black (Ketjen Black EC600JD manufactured by Ketjen Black International Co., Ltd.) as the conductive particles, 1 part of stearic acid as a processing aid, and 5 parts of zinc oxide.

Next, by using a pressure kneader, a master batch 6 was formed by kneading 100 parts of ethylene-propylene-diene terpolymer (EPT 4045 manufactured by Mitsui Sekiyu Kagaku Kogyo Co., Ltd) as the raw rubber A, 60 parts of SRF Carbon Black (Asahi#35 manufactured by Asahi Carbon Co., Ltd.) as a reinforcing agent, 50 parts of a paraffin oil (PW-380 manufactured by Idemitsu Kosan Co., Ltd.) as a softening agent, 1 part of stearic acid as a processing aid, and 5 parts of zinc oxide.

Next, by using an open roll, an unvulcanized rubber composition was formed by kneading 64.40 parts of master batch 5, 151.20 parts of master batch 6, 1.5 parts of sulfur as a vulcanizing agent, 1.0 part of 2-mercaptobenzothiazol (Nocceler-M manufactured by Ouchishinko Chemical Industrial Co., Ltd.), and 1.0 part of dipentamethylenetiuram tetrasulfide (Nocceler-TRA manufactured by Ouchishinko Chemical Industrial Co., Ltd.).

By using this unvulcanized rubber composition, a rubber roller 8 was formed in a manner equivalent to that for the rubber roller 1, and dispersing states of the polymers and the conductive particles were observed by using TEM. According to the results, it was confirmed that the polynorbornen rubber and the ethylene-propylene-diene terpolymer formed a polymeric continuous phase and a polymeric dispersed phase, respectively. In addition, the Ketjen Black used as the conductive particles could be discriminated from the SRF Carbon used as the reinforcing agent due to the shapes different therebetween by the observation using TEM, and it was confirmed that the Ketjen Black was present only in the polymeric dispersed phase.

In addition, in a manner similar to that for the rubber roller 1, the hardness and the electrical properties of the elastic layer of the rubber roller 8 were measured. According to the results, the hardness was a JIS-A hardness of 48°, the electrical resistance was $2.5 \times 10^6$ Ω at 25 V and $5.0 \times 10^5$ Ω at 100 V under the L/L conditions, and the peripheral variation was 1.3 times. In addition, the electrical resistance was $3.0 \times 10^5$ Ω under the H/H conditions, the environmental dependence was 0.2, and the voltage dependence was 0.7.

As described above, in the case of the rubber roller 8, since the raw rubber A was not formed of an ion conductive rubber material, it was understood that, even though the environmental dependence and the peripheral variation were small, the voltage dependence was significant.

The evaluation results described above are shown in Table 1.

TABLE 1

| Rubber Roller | 1 | 2 | 3 | 4 | 5 | 6 | 7 | 8 |
|---|---|---|---|---|---|---|---|---|
| Hardness JIS-A (°) | 52 | 49 | 51 | 53 | 47 | 47 | 50 | 48 |
| L/L Electrical Resistance (Ω) 25 V | $1.8 \times 10^5$ | $1.2 \times 10^5$ | $2.0 \times 10^5$ | $1.5 \times 10^6$ | $7.0 \times 10^5$ | $5.3 \times 10^5$ | $2.1 \times 10^5$ | $2.5 \times 10^6$ |
| L/L Electrical Resistance (Ω) 100 V | $9.0 \times 10^4$ | $6.0 \times 10^4$ | $8.0 \times 10^4$ | $6.0 \times 10^5$ | $1.0 \times 10^5$ | $4.0 \times 10^5$ | $7.0 \times 10^4$ | $5.0 \times 10^5$ |
| H/H Electrical Resistance (Ω) 100 V | $3.5 \times 10^4$ | $2.5 \times 10^4$ | $4.0 \times 10^4$ | $3.0 \times 10^5$ | $7.0 \times 10^4$ | $3.0 \times 10^4$ | $5.0 \times 10^4$ | $3.0 \times 10^5$ |
| Peripheral Variation (Times) | 1.3 | 1.2 | 1.2 | 1.3 | 1.8 | 1.1 | 1.7 | 1.3 |
| Environmental Dependence | 0.4 | 0.4 | 0.3 | 0.3 | 0.2 | 1.1 | 0.1 | 0.2 |
| Voltage Dependence | 0.3 | 0.3 | 0.4 | 0.4 | 0.8 | 0.1 | 0.5 | 0.7 |
| Overall Evaluation | ○ | ○ | ○ | ○ | x | x | x | x |

Concerning the overall evaluation shown in the table, ○ indicates that the peripheral variation of the electrical resistance of the elastic layer of the rubber roller is 1.5 times or more, the environmental dependence is 1.0 or less, and the voltage dependence is 0.5 or less; and the others are marked by x.

As can be seen from the table, it was confirmed that the rubber rollers of the present invention had a peripheral variation of the electrical resistance of the elastic layer of 1.3 times or less, an environmental dependence of 0.4 or less, and a voltage dependence of 0.4 or less. In addition to these results, image defects caused by transfer of contaminants from the charging roll to the photosensitive member was not confirmed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A charging member to which a voltage is applied and which is brought into contact with a member to be charged so as to charge the member, comprising an elastic layer;
   wherein the elastic layer comprises a semiconductive rubber composition having a dispersed domain structure, the dispersed domain structure comprising:
   a polymeric continuous phase comprising an ion conductive rubber material; and
   a polymeric dispersed phase comprising an electron conductive rubber material;

wherein the ion conductive rubber material primarily contains a raw rubber A having an intrinsic volume resistivity of $1 \times 10^{12}$ Ω·cm or less, and wherein the electron conductive rubber material contains a raw rubber B and conductive particles.

2. A charging member according to claim 1, wherein said elastic layer has an electrical resistance in the range of from $1 \times 10^3$ to $1 \times 10^9$ Ω when 100 V is applied under the conditions of a temperature of 15° C. and a relative humidity of 10%.

3. A charging member according to claim 1, wherein said elastic layer is provided with a surface-covering layer thereon.

4. A charging member according to claim 3, wherein said surface-covering layer comprises a binder polymer and conductive particles contained therein.

5. A charging member according to claim 1, wherein the conductive particles comprise a conductive carbon black.

6. A charging member according to claim 1, wherein the conductive particles have a DBP oil absorption of 110 cm³/100 g or more.

7. An electrophotographic apparatus comprising:

a charging member; and an electrophotographic photosensitive member;

wherein said charging member is a charging member to which a voltage is applied and which is brought into contact with a member to be charged so as to charge the member, comprising an elastic layer;

wherein said elastic layer comprises a semiconductive rubber composition having a dispersed domain structure, the dispersed domain structure comprising:

a polymeric continuous phase comprising an ion conductive rubber material; and a polymeric dispersed phase comprising an electron conductive rubber material;

wherein the ion conductive rubber material primarily contains a raw rubber A having an intrinsic volume resistivity of $1 \times 10^{12}$ Ω·cm or less, and wherein the electron conductive rubber material contains a raw rubber B and conductive particles.

8. An electrophotographic apparatus according to claim 7, wherein said charging member is a transfer charging member.

9. An electrophotographic apparatus according to claim 7, wherein said charging member is a charging member for charging said electrophotographic photosensitive member.

10. A process cartridge comprising:

an electrophotographic photosensitive member; and a charging member;

wherein said electrophotographic photosensitive member is assembled integrally with said charging member so as to form a cartridge which is detachably mountable to a main image forming apparatus, and wherein said charging member is a charging member to which a voltage is applied and which is brought into contact with a member to be charged so as to charge the member, comprising an elastic layer;

wherein said elastic layer comprises a semiconductive rubber composition having a dispersed domain structure, the dispersed domain structure comprising:

a polymeric continuous phase comprising an ion conductive rubber material; and a polymeric dispersed phase comprising an electron conductive rubber material;

wherein the ion conductive rubber material primarily contains a raw rubber A having an intrinsic volume resistivity of $1 \times 10^{12}$ Ω·cm or less, and wherein the electron conductive rubber material contains a raw rubber B and conductive particles.

* * * * *

UNITED STATES PATENT AND TRADEMARK OFFICE
CERTIFICATE OF CORRECTION

PATENT NO.    : 6,697,587 B2
DATED         : February 24, 2004
INVENTOR(S)   : Masaaki Harada It is certified that error appears in the above-identified patent and that said Letters Patent is hereby corrected as shown below:

Column 2,
Line 26, "that" (1$^{st}$ occurrence) should read -- than --.

Column 5,
Line 62, "is" should read -- are --.

Column 6,
Line 39, "molecular" (1$^{st}$ occurrence) should read -- molecule --.

Column 7,
Line 27, "adsorption" should read -- absorption --.

Column 11,
Line 3, "(R.H)" should read -- (R.H.) --.
Line 8, "dependence_of" should read -- dependence of --.
Line 11, "is" (1$^{st}$ occurrence) should read -- are --.

Column 12,
Line 35, "is" should read -- are --.

Column 14,
Lines 9 and 48, "was" should read -- were --.

Column 16,
Line 40, "part" should read -- parts --.
Line 47, "vilcanizing" should read -- vulcanizing --.

Column 17,
Line 16, "transfer-of" should read -- transfer of --.
Line 46, "$7.0 \times 10^{10}\ \Omega$" should read -- $7.0 \times 10^{5}\ \Omega$ --.

UNITED STATES PATENT AND TRADEMARK OFFICE
CERTIFICATE OF CORRECTION

PATENT NO. : 6,697,587 B2
DATED : February 24, 2004
INVENTOR(S) : Masaaki Harada It is certified that error appears in the above-identified patent and that said Letters Patent is hereby corrected as shown below:

Column 19,
Line 55, "different_therebetween" shold read -- different therebetween --.

Signed and Sealed this

Third Day of August, 2004

JON W. DUDAS
*Acting Director of the United States Patent and Trademark Office*